John L. Laseter
INVENTOR.

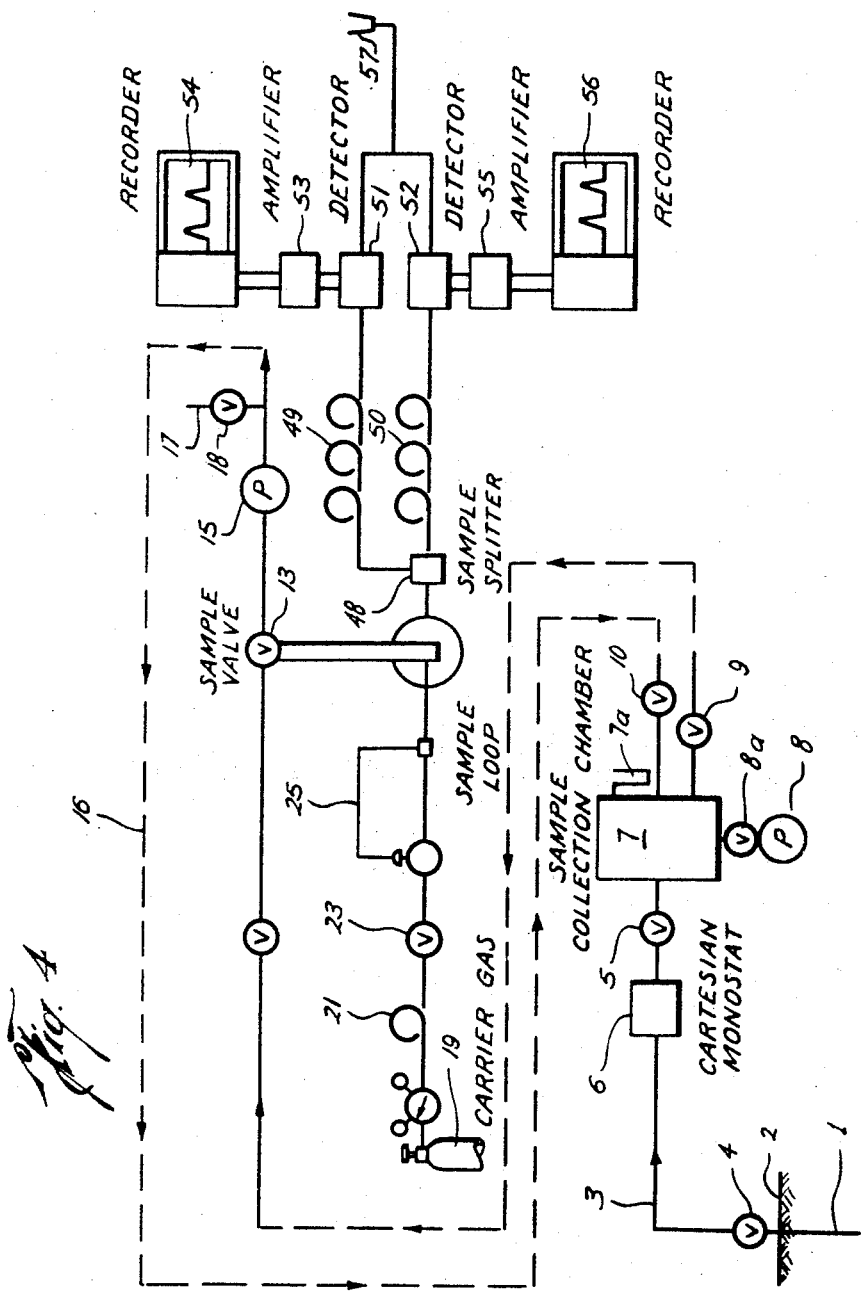

United States Patent Office 3,447,360
Patented June 3, 1969

3,447,360
METHOD OF AND APPARATUS FOR EXPLORING FOR DEPOSITS OF HELIUM AND DETECTION OF HELIUM IN GASEOUS MIXTURES
John L. Laseter, Houston, Tex., assignor to Independent Exploration Company of Texas, Houston, Tex., a corporation of Texas
Filed July 26, 1965, Ser. No. 474,780
Int. Cl. G01n 31/08
U.S. Cl. 73—23.1                                8 Claims

ABSTRACT OF THE DISCLOSURE

Samples of subsurface soil gas are withdrawn at various rates to establish a maximum rate of withdrawal above which the balance between the constituents is upset from what it is in situ. Each sample is circulated in a closed loop after it is withdrawn to maintain it a homogeneous mixture. A test sample is removed from the sample in the closed loop and introduced into a stream of carrier gas. The test sample is passed through a chromatograph, then to a helium detector.

---

This invention relates to the exploration of the earth's surface for locating deposits of helium which may exist beneath the surface and to the detection of helium in gaseous mixtures.

In one of its aspects, this invention relates to the collection of soil gas samples in such manner as to obtain in such samples helium in proportions significant of the actual proportions of helium in soil gas in place in the vicinity from which each sample is taken.

In another aspect this invention relates to the detection of helium in mixtures in which it is present in extremely small proportions such that this invention makes possible the detection of helium in the extremely small proportions in which it is apt to be present in soil gas and thereby provides for the exploration of the earth's surface with a view to locating possible deposits of helium in gaseous mixtures therebelow. In certain of its aspects this invention also makes possible the simultaneous analysis of a sample of a gaseous mixture for detection of the presence of hydrocarbons therein.

It has long been known that by the extraction of samples of gas within the soil adjacent the earth's surface and analysis thereof for the presence therein of hydrocarbons in relatively small proportions, the earth's surface could be explored for an indication of the possible presence of hydrocarbon deposits far beneath the surface. Samples for this purpose have been obtained simply by inserting a hollow probe in the earth to the desired point and withdrawing a sample of soil gas at any convenient rate.

However, because of the extremely low affinity of helium for soil or other surfaces, any attempt to collect soil gas samples in the manner customary for taking samples for detecting hydrocarbons would practically in every instance draw off the helium content of the soil first, and analysis for helium present in samples so taken would give a falsely high indication of the helium present. Because of this any results of such tests would be inconclusive and without value. In exploring for hydrocarbons this difficulty is not encountered to such a degree because of the greater affinity of hydrocarbons for surfaces.

One method heretofore used for analyzing soil gases for the presence of hydrocarbons therein has been by the so-called hydrogen flame detector which, however, is not usable for the detection or inorganic compounds nor for elements such as helium.

Other types of detectors such as the so-called electron drift detector and ultrasonic gas detector have been employed for detecting other substances in various gaseous mixtures, and in such use have, in some cases, employed helium as a carrier gas. However, these have not been employed for the detection of helium in extremely small proportions using other gases as carriers. Actually the sensitivity of such detectors as previously used has not been great enough for the detection of helium in the customarily employed carrier gases.

One of the requirements for helium detection with methods employing a carrier gas has to do with certain characteristics of the carrier gas contrasted with helium. In the electron drift detector the carrier gas must have a different electron affinity from the gas to be detected. With the ultrasonic detector the gas must be one giving a contrast in resulting phase change relative to that given by helium. In ultrasonic detectors also the volume of the ultrasonic cell must be smaller than those which have been employed heretofore for detecting other substances in which helium among others has been used as a carrier gas and the megacycle range employed in previously used ultrasonic detectors has been too great for extreme sensitivity in the detection of helium.

Prior art detectors which have been employed for detection of helium have been of insufficient sensitivity to detect the small concentrations of helium likely to be found in soil gas, it having been determined that the concentrations of helium likely to be present in soil gas will be less than the range of 4 to 8 parts per million. For example, U.S. Patent No. 2,601,272 to E. M. Frost, Jr., issued June 24, 1952, uses a partial pressure gauge for detecting and measuring helium which is unadsorbed on an unactivated charcoal. The patent points out the lack of affinity of helium for adsorption. However, there is no proof provided by this patent that helium is what is detected except a color test which is generally too crude and unreliable for use in the extremely small quantities of helium to be found in soil gas. Furthermore, the apparatus employed in such prior art detectors is generally so bulky and so subject to damage by handling and transportation as to prohibit its use in the field in work such as requires movement from place to place in exploring for the presence of helium in soil gas and hence for providing an indication of the presence of helium in larger quantities in underlying formations.

Broadly it is an object of this invention to provide a method and apparatus for exploring the earth's surface for indications of the likely presence of helium deposits in the earth's interior below such surface.

Another object is to provide a method and apparatus for obtaining soil gas samples from the earth without upsetting the constituency of the gas in situ as represented in the samples obtained, particularly as regards the helium content thereof.

One of the principal objects of this invention is to provide a helium detector suitable for use in exploring for helium deposits in the earth through soil gas analysis, using gas from the soil near the earth's surface to detect leakage from helium deposits below.

Another object of this invention is to provide such a method of detection of helium which will employ apparatus that is simple, rugged, sensitive, and having low power requirement and small physical size or volume so that it is suitable for use as a portable apparatus in the field.

Another object of this invention is to provide an easily carried out method for detecting helium in extremely low concentrations as might occur in soil gas, usually less than the range of 4 to 8 parts per million, using very small volume samples such as available from the soil.

Another object of this invention is to provide a modification of known gas analysis detectors to render them suitable for the detection of helium in very small percentages.

Another object of this invention is to provide for simultaneous testing of identical samples for helium and hydrocarbons.

Another object of this invention is to provide for simultaneous testing of identical samples for helium and hydrocarbons.

Another object of this invention is to provide for simultaneous testing of identical samples for helium and hydrocarbons, each with a detector chosen for greatest efficiency for the specific purpose.

Another object of this invention is to provide successive identical samples for successive confirming tests or for successive tests for different constituents in testing gaseous mixtures for predetermined constituents.

Another object of this invention is to provide a method of detection which will produce a common record with dual traces or record curves showing the results of tests for two different constituents of a gaseous mixture.

Another object of this invention is to provide for the production from the soil of the earth of more nearly representative gas samples with less disturbance and upset of balance between constituents than has been possible by previous methods, so that the tests thereof would provide more accurate indication of the presence and proportions of predetermined constituents, including helium.

Another object of this invention is to provide a method of detection of constituents of gas samples in which samples are provided by extracting them from the earth at a more constant and suitable rate of flow during sampling than has heretofore been provided.

One other object of this invention is to provide a method of testing gas samples comprising mixtures of gases for the detection of predetermined constituents thereof in which the gas sample is continuously maintained at a uniform constituency so that the first or any subsequent analysis will be of substantially the same homogeneous mixture.

Other objects and advantages of this invention will become apparent from the following description taken in connection with the accompanying drawings in which are set forth by way of example and illustration but not by way of limitation certain embodiments of this invention.

In the drawings:

FIG. 1 is a diagrammatic illustration of an assembly of apparatus illustrating an embodiment of this invention in which portions of the same soil gas sample, taken from the earth in such a way as not to disturb its constituency, are then taken from such sample to serve as test samples to perform tests for the presence of hydrocarbons and/or for the presence of helium, respectively, using separate carrier gases and detectors respectively most suitable for the detection of hydrocarbons and helium, and recording the same on a single record sheet.

FIGS. 2 and 3 are diagrammatic illustrations of the operation of a rotary gas sampling valve of the character usable with the method illustrated in FIG. 1, FIG. 2 showing this valve in the position it occupies when the soil gas sample is being circulated therethrough with no test sample being taken therefrom and FIG. 3 showing the same valve rotated to a position in which a test sample of the soil gas sample will be isolated from the main soil gas sample and interposed in the stream of carrier gas for conduction of the test sample to the detector.

FIG. 4 is a view similar to FIG. 1 but showing a modified form of this invention in which two identical detectors are employed for the detection of hydrocarbon gas and of helium, respectively, the same being balanced against one another, and being arranged for using different portions of the same test sample carried along by the same carrier gas.

By contrast with the practice of withdrawing gas for hydrocarbon tests at any convenient rate, which will not give true results with helium tests, it has been found that for any given set of conditions, there is a flow rate which, if exceeded in withdrawing a soil gas sample will result in a sample whose constituents are not in the same proportion with respect to helium content as those of the soil gas in situ, but which rate, if not exceeded, will result in a sample whose other constituents relative to helium will be in a sufficiently true proportion to give an accurate indication of the helium content of the soil gas in situ.

No formula is known for universal application in determining the maximum permissible rate of withdrawal of gas without upsetting the balance of constituents in the sample as compared with the undisturbed soil gas in situ, because so many factors are involved, but the maximum suitable rate for any specific conditions may be readily determined experimentally by tests of the actual soil structure or an analog thereof.

Thus by approximately simultaneously withdrawing samples at various rates from adjacent locations, close enough to each other that practically identical soil and soil gas conditions will be involved, the maximum permissible rate of withdrawal may be ascertained for the soil conditions involved. Similar results can be obtained by successively withdrawing samples at different rates from the same source through a single probe. Analysis of the samples so taken will show that, assuming helium to be present, helium will be indicated in much higher proportions in samples taken at the higher rates, but below a certain rate the proportions will be found nearly the same in all samples. Obviously, such certain rate is the maximum that should be used.

Figure 1:
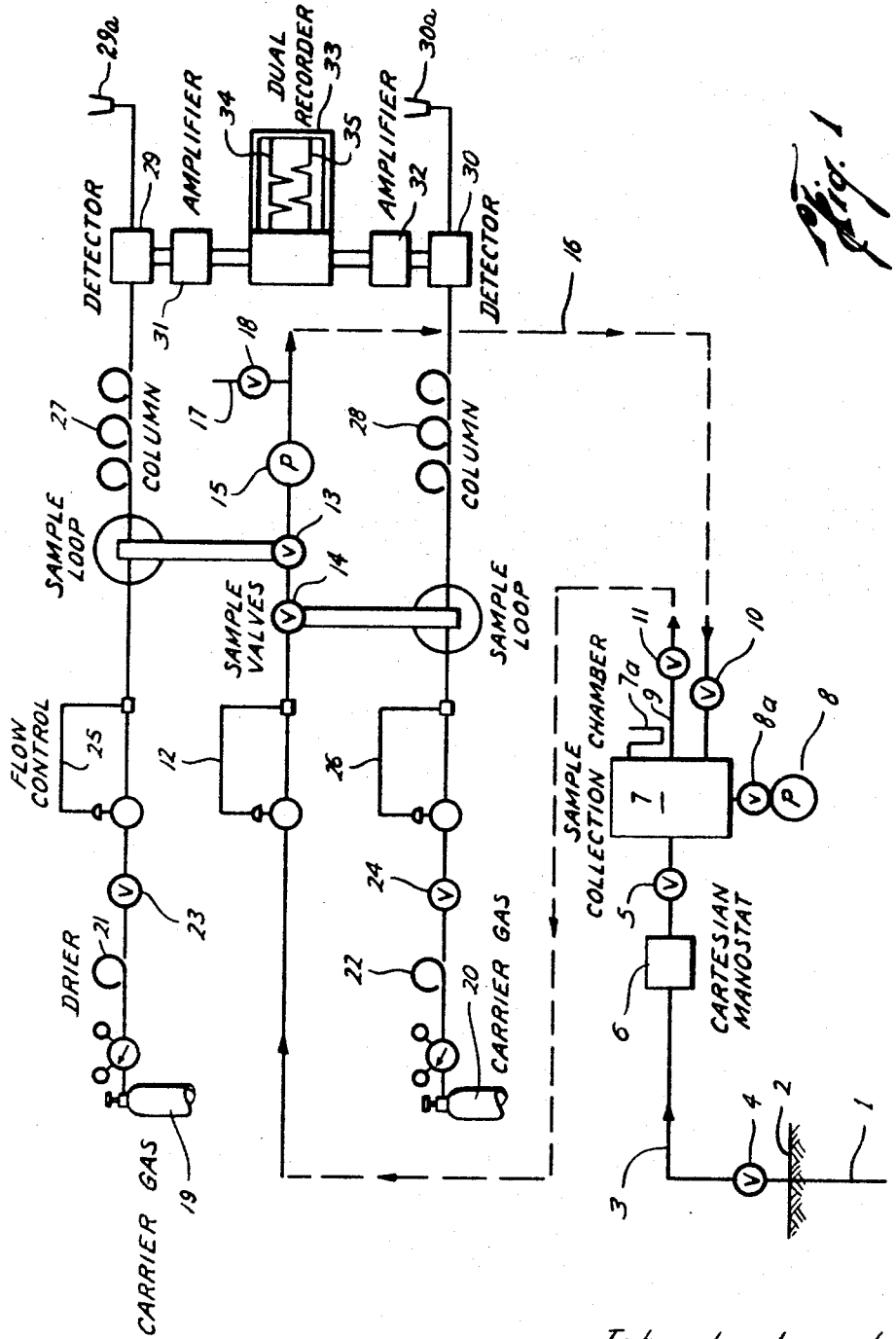

Referring more in detail to the drawings, FIG. 1 illustrates a suitable probe 1 inserted in the soil 2 to a predetermined depth for the purpose of withdrawing a sample of soil gas therefrom. When the probe 1 has been properly positioned within the soil, preferably at a point relatively close to the surface of the earth, gas will be drawn from the soil 2 through the probe 1 and a line 3 which includes suitable manually operated valves 4 and 5 on opposite sides of a Cartesian Manostat 6. Preparatory to withdrawal of the gas sample from the soil the valve 4, located as close as practicable to the earth, will be closed and the entire remainder of the sample system in which the gas sample will be collected and circulated will be opened to the intake of the vacuum pump 8 as by means of valve 8a which may conveniently be connected to the sample collection chamber 7. Pump 8 will then be operated to evacuate the entire system as completely as reasonably possible, after which it will be isolated by closing the valve 8a. Pressure (or vacuum) within the chamber 7 may be indicated by a suitable gauge 7a.

During the withdrawal of the sample of soil gas from the soil 2 the valves 10 and 11 controlling the ports from the chamber 7 leading to the circulatory path presently to be described may be closed if desired. In order to regulate the rate of withdrawal of soil gas from the soil, a suitable accurate flow regulator, such as the Cartesian Manostat 6 is employed and is set to regulate the rate of withdrawal of the soil gas to a certain value, determined in a suitable manner such as above described, low enough so that at the point the gas is withdrawn from the soil, its balance of constituents will not be upset.

Once the collection chamber 7 and the remainder of the system in which the sample will be circulated have been filled to capacity with a soil gas sample withdrawn in the manner and at not more than the maximum rate so indicated, the valves 4 and 5 will be closed to shut off further contact between the soil gas sample within the chamber 7 and the soil gas still within the soil 2. Then, with the valves 10 and 11 open the gas within the chamber 7 will be circulated through the closed circuit passageway. This passageway preferably will include a flow controller 12 for controlling the rate of flow through the closed circuit passageway, a pair of sample valves 13 and 14 for removing test samples from the flowing stream of soil gas sample, a pump 15 for causing the circulation of the soil gas sample through the closed circuit passageway, and a line 16 connecting the pump 15 to the input valve 10 of the chamber 7. A vent opening 17 may be provided at a suitable point in the closed circuit passageway just described, controlled by a valve 18, through which sample gas may be vented to the atmosphere if and when desired.

In FIG. 1 two complete chromatograph systems are depicted with an effluent detector for each. Each system is provided with its own carrier gas source such as 19 for the upper system illustrated and 20 for the lower. If it be considered that the upper system illustrated is the one provided for the detection of helium, then in the case of the use of a detector for the effluent of such system in the nature of an electron drift detector, the preferred carrier gas would be neon. However, in view of the economic disadvantages of using neon because of its high cost, the presently preferred embodiment of the method involves the use of an ultrasonic gas detector in which event the presently preferred carrier gas would be ammonia. In the case of the carrier gas 20, if it be assumed that the lower chromatograph would be employed in the detection of hydrocarbon gases and that the detector employed would be of the hydrogen flame variety, a preferred carrier gas would be nitrogen. Other possible carrier gases suitable for use in each case will be apparent to persons skilled in the art.

In each case the carrier gas is run through a dryer such as the dryer 21 in the case of the carrier gas 19 and the dryer 22 in the case of the carrier gas 20. A suitable dryer material in most instances would be silica gel. Likewise, suitable shut-off valves 23 and 24 may be employed downstream of the dryers 21 and 22 respectively, and flow controllers 25 and 26 may be employed in the respective lines for the purpose of maintaining a constant rate of flow of carrier gas toward the points at which the samples removed from the closed circuit passageway carrying the soil gas sample will be interposed into the respective streams of carrier gas. These samples will be removed from the soil gas sample stream by the sample valves 13 and 14 hereinbefore mentioned and interposed thereby into the respective flowing streams of carrier gas from the carrier gas sources 19 and 20.

The respective streams of carrier gas, now having in each case a test sample interposed therein, will be caused to flow through chromatograph columns 27 and 28 respectively. The column 27, employed in connection with the stream of carrier gas destined for the helium detector, may be packed with a molecular sieve of well-known character, whereas that conducting the stream of carrier gas having the test sample interposed therein destined for the detection of hydrocarbon gases may be packed with a silica gel or equivalent column material.

As is well known, the passage of the gas sample to be tested in each case through the column to which reference has been made will serve to cause a selective reversible adsorption of the gaseous constituents of the sample to separate the sample into successive separate flowing bodies of such constituents. It will be understood that any suitable packing for the respective columns may be employed in accordance with well known characteristics of various packing materials, it being only necessary that the packing material employed in the column through which the sample for testing for helium is to pass be such as to perform an adequate separation of the helium from the other constituents, and that likewise the column through which the sample is to pass which is destined to be tested for hydrocarbons be packed with such a material as will be suitable for the separation of hydrocarbons from the other constituents of the gas sample.

From the column 27 the gas sample to be tested for helium passes to the detector 29 which, as heretofore stated, is preferably of the ultrasonic gas detector type but, with the use of suitable carrier gas, may be of the electron drift detector type hereinafter more fully disclosed. The ultrasonic gas detector may be of the type also hereinafter disclosed and more fully disclosed in an article by F. W. Noble, Kenneth Abel and P. W. Cook of the Laboratory of Technical Development, National Heart Institute, National Institutes of Health, Bethesda, Md., and published in "Analytical Chemistry," published by American Chemical Society, Washington, D.C., vol. 36, No. 8, July 1964, pp. 1421–1427, except that the volume of the cell should be of the order of 15 to 50 microliters and the indicated workable frequency range for helium in a suitable carrier gas such as ammonia would be in the range of 2 to 8 megacycles. It will be understood that although ammonia is the preferred carrier gas, other gases such as argon, nitrogen, etc., may be employed as the carrier.

In the case of the detector 30 which is fed with sample gas from the column 28 for the purpose of detecting hydrocarbons, the detector may be in the nature of any of the well known detectors for detecting hydrocarbon gases, that preferred being the so-called hydrogen flame detector.

The detector signal from the detector 29 is fed through an amplifier 31 and that from the detector 30 through an amplifier 32, these separate amplifiers being arranged in FIG. 1 to feed signals into the same dual recorder 33 so as to make records 34 and 35 respectively constituting correlated indicators of the helium and hydrocarbon contents of the soil gas sample being tested. It will be appreciated that these recorded traces 34 and 35 may be produced by separate recorders on separate sheets but it is preferred that they be produced on the same sheet in correlated form as indicated.

After being tested the tested gas samples and the carrier gas therewith may be emptied to the atmosphere by any suitable device such as the exit rotameters 29a and 30a respectively.

Figure 2:
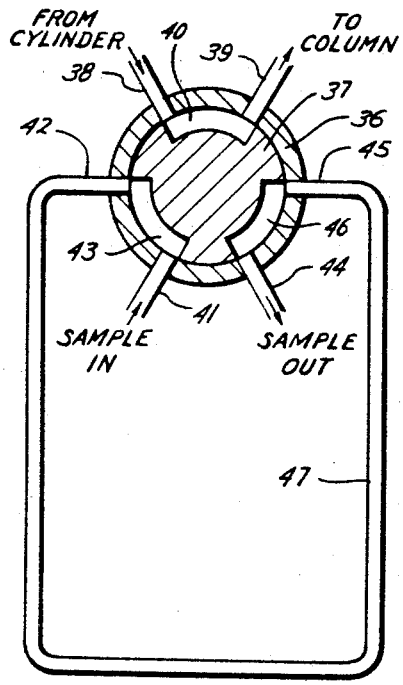
Figure 3:
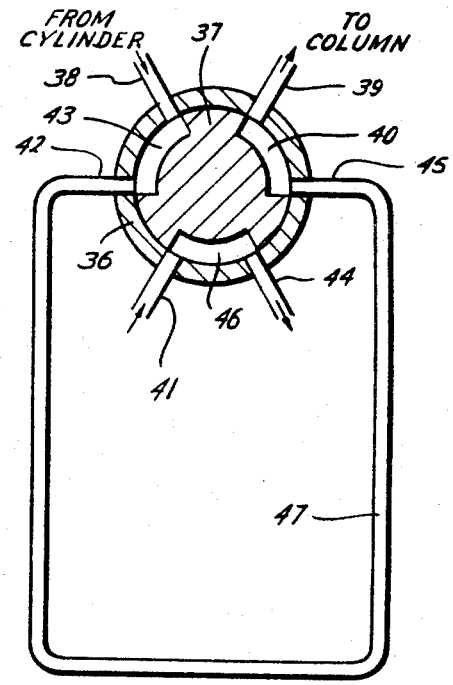

Referring now to FIGS. 2 and 3, there is shown by way of example and illustration a diagrammatic cross section of a gas sampling valve suitable for use in the places indicated by the valves 13 and 14 above described, together with the connection of such valves to the sample loop whereby the gas sample to be tested is interposed in the flowing stream of carrier gas so that it interrupts such stream and is interposed therein.

In FIGS. 2 and 3 a valve housing is illustrated at 36 and within the same is a rotary valve element 37. The valve housing 36 has six openings therein grouped in pairs, the openings in each pair being spaced from each other by the same distance as the openings in each other pair. These openings 38 and 39 of one of these pairs are connected respectively to the source of the carrier gas and to the column, such as the column 27 or 28 hereinabove described. When in the position shown in FIG. 2, a passageway 40 in the valve element 37 interconnects openings 38 and 39 so that carrier gas may flow directly through this valve from the source of carrier gas to the column.

A second pair of openings 41 and 42 in the valve housing 37 are shown in FIG. 2 as being interconnected by a passageway 43 in the valve element 37, and a third pair of such openings 44 and 45 are shown as being interconnected in FIG. 2 by a third passageway 46 in the rotary valve element 37. Interconnecting the openings 42 and 45 is a sample loop 47, while the opening 41 is adapted to be connected to the upstream portion of the closed circuit passageway through which the soil gas sample is circulated in the operation of the system shown in FIG. 1, and the opening 44 is adapted for connection to the downstream portion of the flow passageway followed by the soil gas sample in such circuit.

Thus when the sampling valve is in the position illustrated in FIG. 2 carrier gas will flow uninterruptedly through this valve from the source of carrier gas to the column 27 or 28 as the case may be. At the same time, the soil gas sample will be circulated with a part of its passageway including the entrance opening 41 of the valve housing, the passageway 43 within the valve element 37, the outlet opening 42 of the valve housing, the sample loop 47, the entrance opening 45, the passageway 46 in the valve element 37, and the outlet opening 44 of the valve housing. Thus the soil gas sample may circulate through the sample loop 47 and the valve as illustrated in FIG. 2 without interruption.

When the valve element 37 is rotated to the position shown in FIG. 3, however, that portion of the passageway previously followed by the soil gas sample which involves the loop 47 and the passageway 43 will have been blocked off so that the soil gas sample momentarily located therein will be isolated from the remainder of the passageway of the soil gas sample in its circuit. At the same time, the direct flow of carrier gas in through the opening 38 and out through the opening 39 will have been interrupted so that the carrier gas will be forced to flow in through the opening 38, through the passageway 43 in the valve element 37, out through the opening 42, through the sample loop 47, in through the opening 45, through the passageway 40 in the valve element 37, and out through the opening 39 to the column 27 or 28. In so flowing it will have interposed in its stream that portion of the soil gas sample contained at the time of change of position of the valve from that of FIG. 2 to that of FIG. 3 which was within the passageway 43 and the loop 47. This portion of the soil gas sample, thus becoming a test sample, is carried forward as a separate body of soil gas into the column 27 or 28 to be there separated into constituents as hereinabove described.

At the same time, with the valve in the position shown in FIG. 3, the soil gas sample will continue to circulate in a closed circuit which omits the sample loop 47 for the time being and instead, when it flows in through the opening 41 of the valve housing 36, it will flow through the passageway 46 of the valve element 37 and directly out through the opening 44 on its way to the pump 15. Thus the continuous flow of the soil gas sample in its closed circuit will not be interrupted except momentarily during the actual movement of the sampling valve from the position shown in FIG. 2 to that shown in FIG. 3, yet the flow of carrier gas will be interrupted and a test sample of the soil gas will be interposed therein and conducted thereby to the column 27 or 28.

In FIG. 4 there is illustrated a form of the invention in which the same carrier gas is employed for conducting the test sample to be tested for the presence of helium and for conducting the test sample to be tested for the presence of other gases such as hydrocarbons.

In the arrangement shown in FIG. 4 the passageway for circulating the soil gas sample and the arrangement for withdrawing it from the earth are identical with that illustrated and described in connection with FIG. 1 and will not be redescribed except to note that in view of the fact that only one carrier gas stream is employed, the necessity for more than one sampling valve is eliminated and only one sampling valve 13 is illustrated. This valve may be the same in all respects as the valve illustrated as the valve 13 in FIG. 1 and as that described in connection with FIGS. 2 and 3.

It is contemplated that in the form of the invention illustrated in FIG. 4 the carrier gas source and stream may be identical with either of those illustrated in FIG. 1 up to and including the point at which the test sample is to be introduced through the sampling valve 13. Hence the elements in this stream up to the point indicated have been given the same numerals as those in the upper stream illustrated in FIG. 1 and will not be redescribed. However, it is noted that the carrier gas, being used both for the conduct of the sample portion employed in testing for helium and for the sample portion employed in testing for hydrocarbons, must be one suitable for both. It is contemplated that in the arrangement of FIG. 4 the detectors will be of the ultrasonic variety and that suitable carrier gases for this purpose would be argon or nitrogen, the former being preferred.

With more specific reference to the portion of the carrier gas path downstream from the sampling valve 13 in FIG. 4, it is contemplated that inasmuch as a column used for the separation of helium for test purposes would be packed with a material most suitable for that purpose and that such material probably would not be the preferable material for packing a column for the separation of hydrocarbons for test purposes. Therefore, it is contemplated that a splitter 48 will be employed for splitting the stream of carrier gas and the test sample carried along therewith into two parts, one of which will pass to the column 49 packed with material most suitable for separation of helium, and the other part of which will be passed to the column 50, packed with material most suitable for the separation of hydrocarbons.

As above noted, it is contemplated in this form of the invention that both of the detectors 51 and 52 will be of the ultrasonic variety, one serving to detect and to give off signals indicating the presence of hydrocarbons in the portion of the test sample passed to it, and to transmit such signals to an amplifier 53 which in turn feeds a recorder 54 adapted for making a record of the helium so detected. On the other hand, the detector 52 is adapted to give off a signal indicating hydrocarbons detected and to transmit the same to an amplifier 55 which in turn feeds a recorder 56 adapted to record the hydrocarbons so detected.

It will be understood that the two recorders 54 and 56 may be in the form of one dual recorder as illustrated in connection with FIG. 1.

The carrier gas and the test samples after being passed through the detectors 51 and 52 will be suitably vented as through an exit rotameter 57.

Certain components of the apparatus above described have been heretofore known, as such, although not in the combinations. Thus, in other uses, the Cartesian Manostat 6 is well known as an adjustable flow regulator and is commercially available. It functions as an orifice type flow meter, closing an orifice when the flow therethrough exceeds a predetermined value. It is particularly suited for accurate regulation of low rates of flow of gas.

Figure 5:
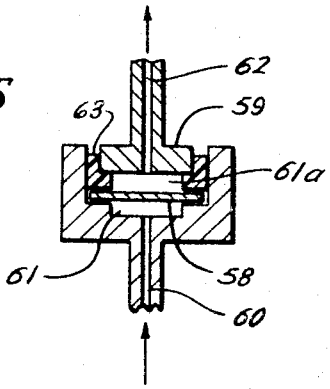
FIG. 5 is a schematic cross section through an electron drift type of detector suitable for detecting helium in gaseous mixtures in extremely small concentrations of the order likely to be found in soil gas.

FIG. 5 is a diagrammatic representation of an electron drift detector of a type known to have parts per billion sensitivity to many gases. It employs a tritium plate or foil 58 as one of two electrodes, the other electrode 59 being spaced about 1 mm. thereabove. The tritium electrode may be, for example ½" x ½" 250 millicurie tritium foil. This forms a detector cell volume of about 160 microliters. The carrier gas passes into the cell at 60 to the space 61 under the tritium 58, thence around the tritium into the small volume 61a between the two electrodes, and then exits through a hole 62 in the upper electrode. A ring of suitable insulation, such as tetrafluorethylene 63 may be employed as a separator between the electrodes and a closure for the space therebetween, it being understood that the tritium will be mounted so as to permit the gas to pass therearound from the entrance 60 as above described. A high negative voltage is applied to the upper electrode to obtain field gradients of 4,000 volts per centimeter or greater.

Such detectors have been used with various carrier gases including helium, in the past, for detection of various other gases, but have not been used for the detection of helium, using some other gas as a carrier. In accordance with this invention, it has been discovered that this type detector may be used for the detection of helium, using another gas as a carrier, and that if neon be used as a carrier gas, this type detector may be used to detect both helium and hydrocarbon gases. The carrier gas to be used must be one having a substantially different electron affinity from helium. Neon is the most suitable from this standpoint but is presently very expensive and economical considerations might prohibit its use.

Figure 6:
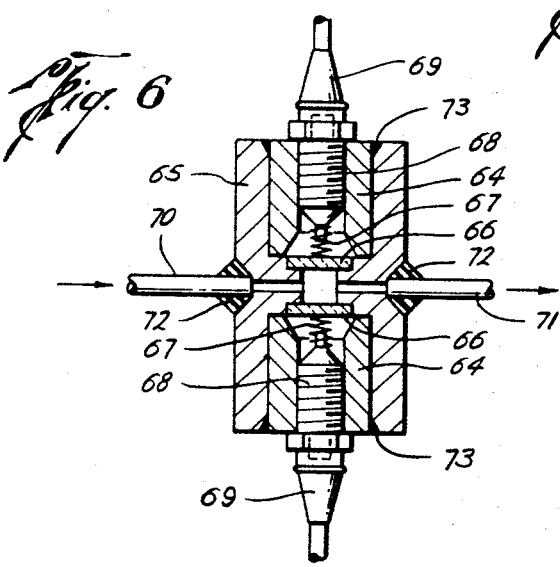
FIG. 6 is a cross section through an ultrasonic type of detector cell suitable for detecting helium in the extremely small concentrations of the order likely to be found in soil gas.

In FIG. 6 is shown a cross section through a cell structure of an ultrasonic detector of a type suitable for use in this invention, either for the detection of both helium and hydrocarbons, or for detection of helium only, or in combination with another type detector such as a hydrogen flame, as part of an apparatus, for detecting helium and hydrocarbons in two separate detectors.

In the cell shown in FIG. 6 there are two identical invar transducer mounts 64 mounted in opposite end portions of a sound tube 65 of tetrafluoroethylene or other suitable insulating material which may be filled with glass or ceramic. The transducers 66 for 4 mc. operation are 0.250 inch diameter X-cut quartz crystals ground to a thickness for a fundamental frequency of 4 mc. The front surface and edges of transducers 66 are chrome-gold plated and grounded by edge and front face contact with the invar mounts 64 and preferably bonded thereto by suitable material such as electrically conductive plastic, e.g., a silver impregnated epoxy. The crystal is suitably held in place and sealed about its edges as by a ring of adhesive silicone rubber around the front surface edge. Electrical contact with each transducer adjacent its center is provided by a small spring 67 carried by a connector 68 for a coaxial cable 69 which connector is threaded or otherwise suitably secured in the transducer mount. The transducer mounts 64 and the gas inlet tube 70 and outlet tube 71 are suitably sealed in place in the tube 65 as by adhesive silicone rubber 72 and 73.

Figure 7:
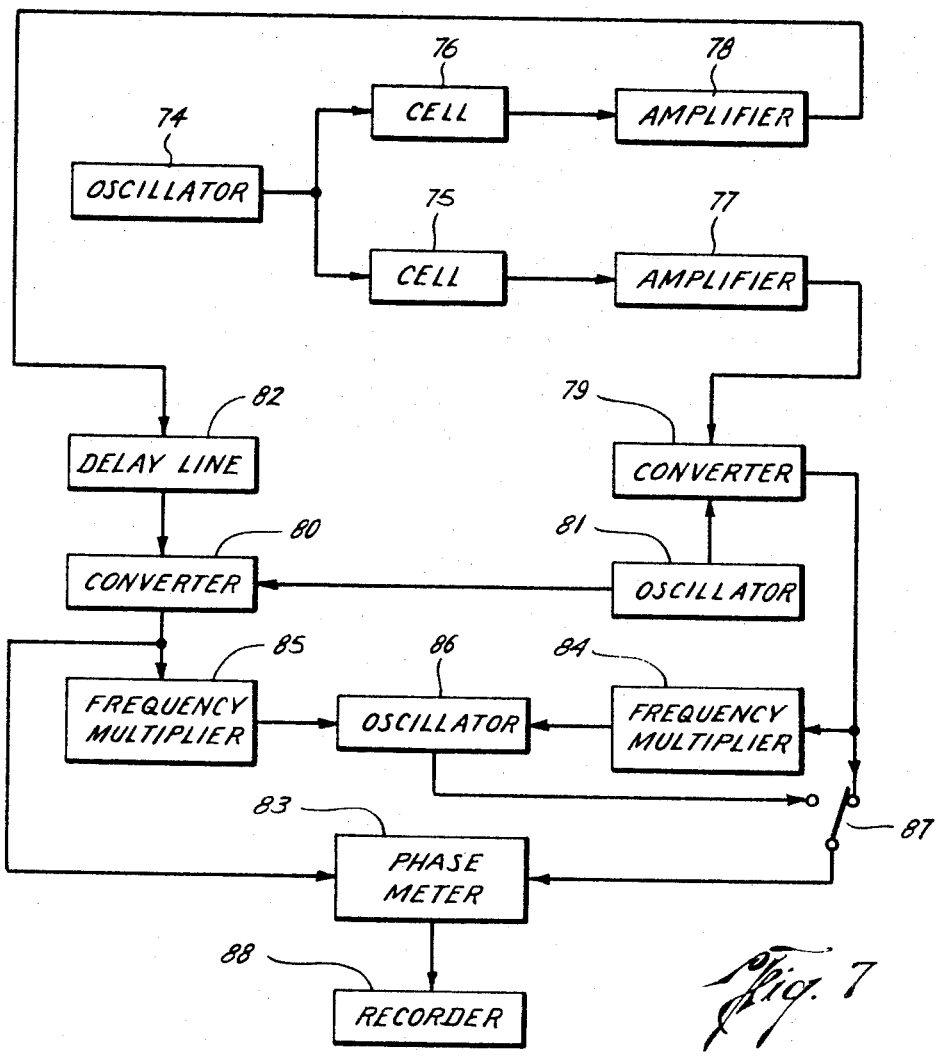
FIG. 7 is a block diagram showing an oscillation comparator arrangement for use with the cell shown in FIG. 6.

In FIG. 7 is shown a simplified block diagram of a phase measuring system capable of using the cell shown in FIG. 5. In this system a first oscillator 74 is caused to feed one cell 75 wherein the gaseous mixture is present, and at the same time to feed another cell 76 wherein only carrier gas is present. The output of each cell is passed through an amplifier such as 77 and 78 respectively and to converters 79 and 80 respectively in which their frequencies are lowered without changing their phase relationship. Two converters, carrying the amplified received signals transmitted through the cells containing carrier gas and the gas mixture, respectively, are then caused to beat a second crystal controlled oscillator 81 which oscillates at a frequency differing from that of oscillator 74 by a suitable difference such as ten kilocycles. This results in outputs from converters 79 and 80 which are ten kilocycle signals with the same phase shift as those coming from cells 75 and 76. A delay line 82 is employed in the connection between amplifier 78 and converter 80 for adjusting the base line phase to correspond to the zero of phase meter 83, into which the ten kilocycle outputs of converters 79 and 80 are fed. In this meter the phase difference of the two signals is determined.

If necessary for increased sensitivity the outputs of converters 79 and 80 may be connected also to frequency multipliers 84 and 85 respectively. Multiplier 84 is a nine times multiplier and 85 is an eight times multiplier. The output signals from these multipliers are then fed to a third oscillator 86 to produce therefrom a third ten kilocycle signal. Between the outputs of converter 80 and that of oscillator 86 there will be a 9° difference in phase for every degree of difference in phase between converters 80 and 79. Then if the phase meter 83 has a full scale deflection of 180°, by switching the connection of one input to the phase meter from converter 79 to oscillator 86 as by switch 87, full scale deflection of the meter will be caused by a 20° phase difference.

The output of the phase meter 83 may in any event be fed into a recorder 88 of any suitable well-known nature suitable for recording such signals.

Figure 8:
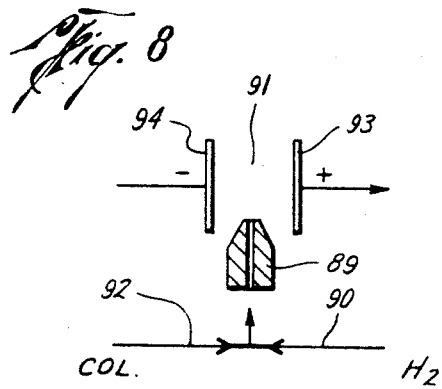
FIG. 8 is a diagrammatic illustration of a hydrogen flame detector such as used heretofore in detecting hydrocarbons in soil gas.

Finally, there is shown in FIG. 8 a diagrammatic illustration of a hydrogen flame detector such as heretofore used for detecting hydrocarbons and which may be used in combination with one of the other types of detector hereinbefore mentioned to run tests for hydrocarbons simultaneously with testing for helium on the same gaseous mixture samples. In this type of detector a burner 89 is fed with hydrogen through one line 90 to produce a flame in the space 91 between two electrodes 93 and 94 having a suitable voltage thereacross, e.g., 300 v. A sample gas mixture is then fed through line 92 into the hydrogen stream going to the burner and enters the burner as a mixture. Thereupon a complex ionization takes place in space 91 and causes an ion current between the two electrodes, which is measured by a highly sensitive electrometer circuit and in known manner drives a suitable recorder.

The specific detectors and disclosures in connection therewith as contained in FIGS. 5, 6, 7 and 8 are by way of illustration of detectors having suitable sensitivity potentials and suitably complying with ruggedness, physical size, etc., characteristics to make them suitable for the purposes of this invention. While these detectors in many of their essentials are old in various other uses, no instance is known in which any of them have been used for the detection of helium nor in which a suitable carrier gas has been employed which, by comparison with helium, would serve in such detectors for the detection of helium. Of course, the hydrogen flame detector is in itself incapable of detecting helium.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. A method of determining the helium content of subsurface soil gas at a selected location comprising, withdrawing a sample of subsurface soil gas at a given rate of withdrawal, analyzing said sample to determine the percentage of helium and other constituents therein, and repeating the withdrawal and analyzing steps for samples withdrawn at different rates of withdrawal to establish a maximum withdrawal rate for the selected location above which the proportion of helium to other constituents of the soil gas samples is out of balance with the proportion of helium in the soil gas in situ.

2. A method of exploring an area of the earth's surface for detection of helium deposits which may be located beneath such surface area, which comprises laying out a grid of test locations on such surface area, withdrawing a plurality of samples of the subsurface soil gas at one or more of the test locations with each sample being withdrawn at a different rate, analyzing the soil gas samples to determine for each sample the proportion of helium to the other constituents of the sample to establish a maximum withdrawal rate for the area above which the proportion of helium to the other constituents of the soil gas samples is out of balance with the proportion of helium in the soil gas in situ, withdrawing a sample of the subsurface soil gas at each test location at or below the established maximum withdrawal rate, analyzing each sample for the helium content thereof, and plotting the helium content of the subsoil gas at each test location to determine anomalies of subsoil gas helium content over said surface area.

3. The method of exploring the earth's surface for the detection of helium deposits which may be located beneath such surface which comprises withdrawing a sample of subsurface soil gas at a preselected rate, continuously circulating the sample so withdrawn through a closed circuit to maintain it in a thoroughly mixed homogeneous state, propelling a stream of carrier gas having physical characteristics readily distinguishable from those of helium along a predetermined path, segregating from the soil gas sample flowing in said closed circuit a test sample of the gaseous mixture to be analyzed, interrupting the stream of carrier gas by interposing therein said test sample, conducting the stream including the carrier gas and the body of test sample to a detector for discriminating between the physical characteristics of helium and the other gaseous constituents of the stream, and producing a sensible indication of the proportionate amount of helium detected by said detector and repeating said method to determine the proportionate amount of helium in test samples taken from other gas samples withdrawn from the ground at different rates of withdrawal until the proportionate amount of helium in two or more such test samples indicate that the balance of constituents in said test samples was not upset by the rates at which said soil gas samples were withdrawn.

4. The method of analysis of a gaseous mixture for the detection of helium which may be included therein, which comprises the steps of: propelling a stream of carrier gas having physical characteristics readily distinguishable from those of helium along a predetermined path, continuously circulating in a closed circuit passageway a larger body of the gaseous mixture to be analyzed to maintain it as a homogeneous mixture, blocking off a predetermined portion of the passageway to isolate a smaller body of said mixture in said predetermined portion, removing said smaller body from said predetermined portion of said passageway for interposition in the stream of carrier gas, interrupting the stream of carrier gas by interposing therein said smaller body as a test sample of the gaseous mixture to be analyzed, conducting the stream including the carrier gas and the test sample to a detector for discriminating between the physical characteristics of helium and the other gaseous constituents of the stream, and producing a sensible indication when helium is detected by said detector.

5. The method of analysis of a gaseous mixture for the detection of helium which may be included therein, which comprises the steps of: propelling a stream of carrier gas having physical characteristics readily distinguishable from those of helium along a predetermined path, continuously circulating in a closed circuit passageway a larger body of the gaseous mixture to be analyzed to maintain it as a homogeneous mixture, extracting from said continuously circulating larger body a smaller body of said gaseous mixture to be interposed in the stream of carrier gas, interrupting the stream of carrier gas by interposing therein said smaller body as a test sample of the gaseous mixture to be analyzed, conducting the stream including the carrier gas and the test sample to a detector for discriminating between the physical characteristics of helium and the other gaseous constituents of the stream, and producing a sensible indication when helium is detected by said detector.

6. The method of analysis of a gaseous mixture for the detection of helium which may be included therein, which comprises the steps of: propelling a stream of carrier gas having physical characteristics readily distinguishable from those of helium along a predetermined path, withdrawing a sample body of soil gases as a gaseous mixture from a predetermined point in the soil beneath the earth's surface, isolating said body of gaseous mixture so extracted, circulating said body of gaseous mixture continuously in a closed circuit passageway to maintain it as a homogeneous mixture, blocking off a predetermined portion of the passageway to isolate a smaller body of said mixture in said predetermined portion of the passageway, removing said smaller body of the mixture from said predetermined portion of the passageway, interrupting the stream of carrier gas by interposing therein said smaller body as a test sample of the gaseous mixture to be analyzed, conducting the stream including the carrier gas and the test sample to a detector for discriminating between the physical characteristics of helium and the other gaseous constituents of the stream, and producing a sensible indication when helium is detected by said detector.

7. Apparatus for use in exploring the earth's surface for helium which comprises a sample accumulating container, a cut-off valve, a probe connected to said container through said cut-off valve and having an intake opening adapted to be positioned below the earth's surface to receive soil gas therefrom, means for producing a partial vacuum in said container to induce flow into said container of soil gas from the intake opening of said probe when the same is in the earth's surface and said cut-off valve is open, a Manostat interposed in the connection between said probe and said container for regulating the flow from said probe to a predetermined maximum rate, a closed circuit passageway having both ends connected to said container through which a gas sample in said container may be circulated continuously to keep it thoroughly mixed and homogeneous during the testing operation, and pump means incorporated in said circuit for forcing said circulation.

8. Apparatus for analyzing a gaseous mixture to determine quantitatively the presence therein of a constituent such as helium, said apparatus comprising a gas sample collection container, means for inducing the flow into said container of a representative sample of the gaseous mixture to be analyzed, a closed circuit gas passageway having both of its ends connected to said container whereby the sample gas so drawn into said container may be circulated continuously during the making of a test analysis to maintain said gas sample thoroughly mixed and homogeneous, pump means incorporated in said closed circuit for forcing said sample to circulate therethrough, a sample loop normally connected at both its ends to adjacent portions of and forming a part of said closed circuit whereby said loop will contain a flowing volume of the gaseous mixture to be analyzed, a gas chromatograph and detector capable of detecting the constituent for whose presence the analysis of said gas is desired, and means for simultaneously short-circuiting said closed circuit passageway past said sample loop and interposing said sample loop in series with said chromatograph, whereby the gas sample in said sample loop will be passed through said chromatograph and detector.

References Cited

UNITED STATES PATENTS

| | | | |
|---|---|---|---|
| 2,479,787 | 8/1949 | Stevens | 73—421.5 |
| 3,112,639 | 12/1963 | Maxwell | 73—23.1 |
| 3,121,321 | 2/1964 | Karasek | 73—23.1 |
| 3,307,912 | 3/1967 | Davis | 73—23.1 |
| 3,336,792 | 8/1967 | Boys | 73—23.1 |

FOREIGN PATENTS 76,994  1/1954  Denmark.

(Other references on following page)

OTHER REFERENCES

An article entitled "A Sensitive Versatile Acoustic Gas Analyzer Particularly Suitable for the Analysis of Anesthetic Mixtures," in Review of Scientific Instruments, September 1954, vol. 25, No. 9, pp. 927 and 928.

An article entitled "Ultrasonic Gas Analyzer," in Instruments and Automation, vol. 28, November 1955, pp. 1916 and 1917.

RICHARD C. QUEISSER, *Primary Examiner.*
JERRY W. MYRACLE, *Assistant Examiner.*

U.S. Cl. X.R.

73—421.5